Aug. 14, 1962 A. GIANNETTI 3,049,188
AUTOMATIC STOPPING DEVICE FOR AUTOMOBILES
Filed July 22, 1959 2 Sheets-Sheet 1
Fig. 1
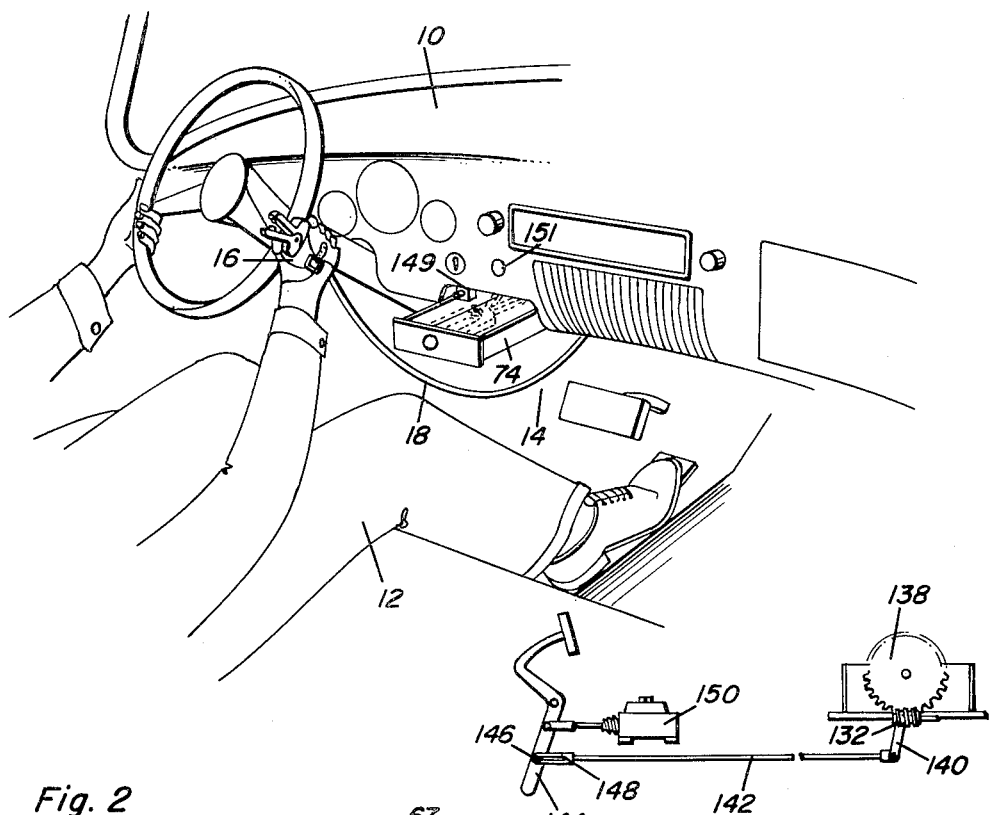
Fig. 2
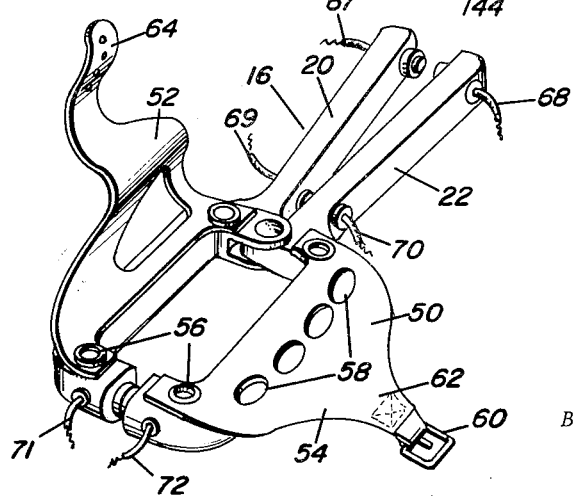
Fig. 6
Anthony Giannetti
INVENTOR.

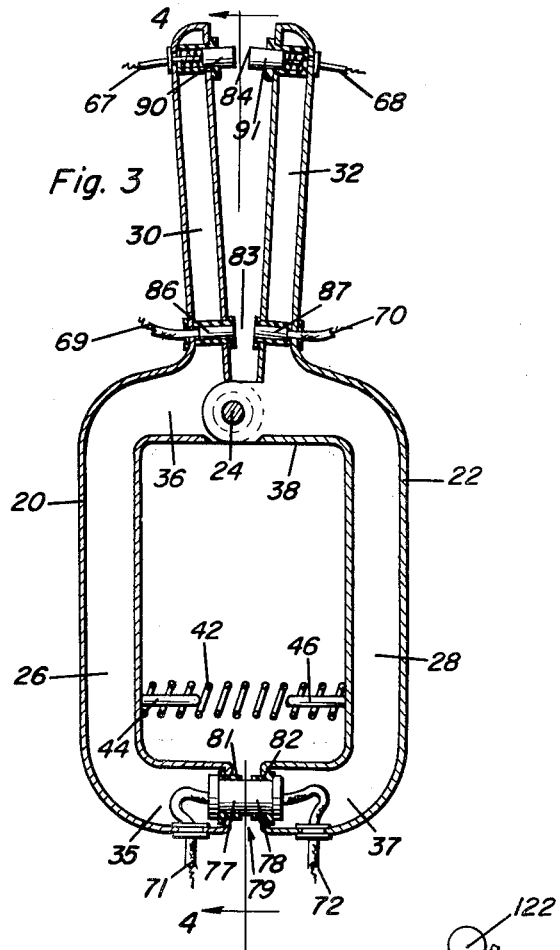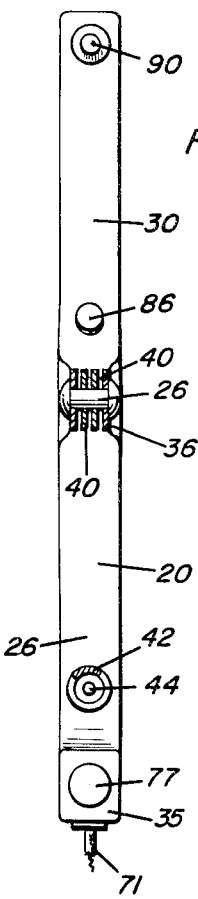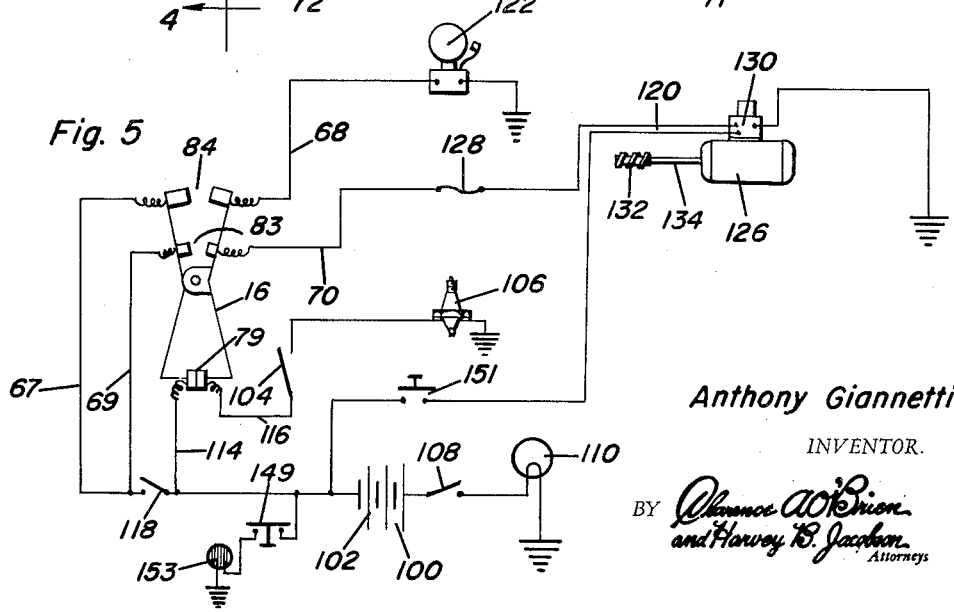
Anthony Giannetti
INVENTOR.

United States Patent Office 3,049,188
Patented Aug. 14, 1962

3,049,188
AUTOMATIC STOPPING DEVICE FOR AUTOMOBILES
Anthony Giannetti, 36 Highland St., Paterson, N.J.
Filed July 22, 1959, Ser. No. 828,793
11 Claims. (Cl. 180—82)

This invention relates to safety devices and more particularly to a device for automatically discontinuing engine operation in the motor vehicle when the motor vehicle operator becomes drowsy or falls to sleep.

An object of the invention is to provide a safety device for a motor vehicle which enables a motor vehicle operator to exercise control over the operation of the motor vehicle by holding a special handle in one position during normal operation of the motor vehicle, but as soon as the motor vehicle operator relaxes his grip on the handle, a number of functions are caused to take place. These functions may vary, but it is preferred that a brake actuating mechanism for the motor vehicle brakes be immediately operated, the engine discontinue operation, for instance, by opening the ignition circuit thereof, and some type of audible alarm be given to promptly arouse the motor vehicle operator.

One of the important features of the invention is the handle adapted to be gripped by the motor vehicle operator. The handle is a very small device maintained in the palm of the hand and strapped onto the motor vehicle operator's hand in such a way that it will not materially interfere with any normal use of the motor vehicle operator's hand.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a motor vehicle equipped with a safety device in accordance with the invention.

FIGURE 2 is a perspective view of the handle comprising a special feature of the invention.

FIGURE 3 is a longitudinal sectional view of the handle in FIGURE 2.

FIGURE 4 is a sectional view taken on the line 4—4 of FIGURE 3.

FIGURE 5 is a wholly diagrammatic view showing pictorially the integration of the handle with certain parts of the motor vehicle and showing an alarm system wired therewith.

FIGURE 6 is a diagrammatic elevational view showing one type of connection between the safety device and the brake system of the motor vehicle.

In the accompanying drawings there is illustrated a fragmentary part of the interior 10 of a typical conventional motor vehicle. A part of a motor vehicle operator 12 is shown seated in driving position in the vehicle. This is a typical setting for safety device 14 which is constructed to illustrate the principles of the invention. The safety device is made of a special handle or detecting device 16 having an electrical multi-conductor cable 18 extending therefrom. Handle detecting device 16 is made of two arms 20 and 22 connected together intermediate their ends by means of a pivot 24. The pivot may be an ordinary pin, and in order that the arms be light weight, they may be made of hollow plastic or metal (FIGURE 3) configuration. The arms each has U-shaped portions 26 and 28 and straight portions 30 and 32 extending from one pair of ends 36 and 38 of the U-shaped portions 26 and 28. Pivot 24 extends through aligned apertures in interdigitated ears 40 (FIGURE 4) at the juncture of ends 36 and 38. There are yielding means normally biasing the arms in one portion. These means consist preferably of a spring 42 extending across the space defined by U-shaped portions 26 and 28, and the spring is suitably held in place, for instance by having the coils at the ends thereof embracing stop pins 44 and 46 fixed to the inner surfaces of the portions 26 and 28. The bias of spring 42 is in a direction tending to hold end portions 35 and 37 of U-shaped portions 26 and 28 spread so that a conscious effort of the motor vehicle operator is required to retain end portions 35 and 37 together.

There are mounting means connected to U-shaped portions 26 nad 28 for fastening these portions to the hand of the motor vehicle operator 12. These means consist preferably of a strap 50 having strap sections 52 and 54 individually attached, for instance, by rivets 56, to portions 26 and 28. Strap section 54 has four apertures 58 through which the fingers of the motor vehicle operator's hand are adapted to pass. This section also has a buckle 60 at one reduced end 62 thereof through which strap section 64 at the reduced end on the opposite section 52 is adapted to extend. Strap section 52 is shaped to conform to the back part of the thumb region of the hand as shown in FIGURE 1, while strap section 54 extends over the knuckles of the four fingers of the hand.

The multi-conductor cable 18 has, in the illustrated embodiment of the invention, six conductors 67, 68, 69, 70, 71 and 72 (FIGURE 2) therein, and the inner extremity of the conductor is adapted to be connected in the motor vehicle circuits (FIG. 5) to exercise various control functions over portions of the motor vehicle and also to perform other functions as will be described subsequently. Further, it is within the contemplation of the invention to have the motor vehicle equipped with a drawer 74 or some other suitable compartment within which to receive the handle 16 and closed for storing thereof during those times that it is not in use. Although the conductors of cable 18 may be permanently connected in place within the motor vehicle, they may also be attached by means of a plug and socket which is properly wired as shown diagrammatically only in FIGURE 5.

A pair of contacts 77 and 78 which constitute switch 79 are carried by the confronting end portions 35 and 37. The contacts may be held in place by any suitable means, for instance, by being fixed in insulating grommets 81 and 82 that are supported in apertures in the faces of portions 35 and 37. Conductors 71 and 72 are attached to contacts 77 and 78 respectively. This is a normally open switch. There are two normally closed switches 83 and 84 carried by portions 30 and 32 of arms 20 and 22. Switch 83 is constructed of contacts 86 and 87 carried the same as contacts 77 and 78, and contacts 86 and 87 are attached to conductors 69 and 70, respectively. Switch 84 has contacts 90 and 91 which are operatively connected to conductors 67 and 68, and the only distinction between switch 83 and 84 is that the contacts 90 and 91 are spring loaded much the same as the brushes of a motor or generator.

As shown in FIGURE 5, the conventional electrical control circuit means 100 of a motor vehicle is only diagrammatically shown. It includes a source 102 of electrical potential, together with an ignition switch 104 to energize the ignition circuit as schematically indicated for operating spark plug device 106 disabled upon opening of switch 79 and the conductor extending thereto. Switch 108 is interposed in the circuit of the motor vehicle in such a way as to illuminate lamp 110 which may be in a sign mounted at the back of the motor vehicle to indicate the existence of the signal device in the motor vehicle and its operation. Electrical conductor 114 taken from the electrical system in the motor vehicle connects switch 79 in series with the ignition switch 104 for the ignition circuit. Conductors 114 and 116 are connected by way of control switch 118 to the electrical system in the motor vehicle, and these conductors 69 and 67 are attached to switches 83 and 84. Electrical conductors 70 and 68 extend from switches 83 and 84 to a brake operating circuit 120 and to an alarm circuit 122, respectively. The alarm circuit is diagrammatically illustrated as including an alarm apparatus such as a bell or a buzzer and this is located in the motor vehicle to arouse the motor vehicle operator when switch 84 is closed. Switch 83 is operatively connected with a control mechanism such as motor 126 through fuse 128. The motor is preferably a reversible motor, with a reversing switch 130 thereon so that successive energization of the motor causes it to operate in a clockwise and counter-clockwise direction, respectively and successively.

Motor mechanism 126 has a worm 132 attached to the shaft 134 thereof, and the worm is in engagement with the worm wheel 138 to which crank arm 140 is secured. This crank arm is attached by means of a link 142 to the foot brake operating lever 144 of the motor vehicle. A pin 146 and slot 148 connection between link 142 and 144 will enable the foot brake to be actuated without interference by the connection between link 142 and brake arm 144. The master cylinder 150 of the motor vehicle brake operating system is shown operatively connected to the brake arm 144, as is the usual mechanical arrangement in an ordinary hydraulic brake system of a motor vehicle.

In use and operation, drawer 74 is opened to expose the device 16, thereby closing the disabling switch 149 held open by the drawer when in closed storing position much the same as the switch in the glove compartment of an automobile. Switch 149 is wired in series with a signal lamp 153 mounted at the rear of the vehicle. The handle 16 is then removed from the drawer and attached onto the hand as previously described, and the motor vehicle operator is able to operate his motor vehicle when switch 79 is closed, that is, by hand pressure closing the arms of handle 16. At this time, switches 83 and 84 are automatically opened due to the construction of the handle.

As soon as the motor vehicle operator for any reason whatsoever releases his grip on the handle 16, spring 42 causes switches 83 and 84 to close and switch 79 to open. Upon opening of switch 79, the ignition circuit of the motor vehicle is opened disabling the operating spark plug device 106. At the same time, switch 84, being closed, completes the circuit to the audible electrical signal apparatus 122 and switch 83 closes the brake operating circuit. The brake operating circuit causes motor 126 to be energized, thereby pulling link 142 through the gear train including worm 132, worm wheel 138 and arm 140. Consequently, the brakes of the motor vehicle are at once applied.

Should the motor vehicle operator become awakened or be made aware of his drowsiness, application of hand pressure to the switch 151 preferably mounted on the vehicle instrument panel will cause reversible motor 126 to be operated in the opposite direction, thereby returning arm 140, link 142 and the brake pedal to the raised position and releasing the brakes, this requiring only a simple application of pressure in a direction to close switch 151 momentarily. Obviously, either mechanical or electrical limits for the motor are required so that the motor will not override its extent of rotation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety device for a motor vehicle having a steering wheel adapted to be grasped by a vehicle driver, comprising vehicle control means operative when actuated and adapted to interrupt engine operation, energize signal warnings and apply vehicle brakes, detecting means operatively connected to said vehicle control means and responsive to relaxation of the vehicle driver to actuate said vehicle control means, receptacle means mounted in the vehicle for displacement between detector exposing and storing positions and disabling means operatively interconnected with said vehicle control means and receptacle means to disable said vehicle control means in response to displacement of the receptacle means to said detector storing position.

2. The device as defined in claim 1, wherein said detecting means includes control switch actuating means biased in one direction and mounted on the driver's hand only for actuation in the opposite direction in response to gripping of the steering wheel with a predetermined gripping pressure.

3. A safety device for a motor vehicle, said safety device comprising a handle having a pair of arms, means pivotally connecting said arms together intermediate the ends thereof, resilient means holding said arms in a first position, said pair of arms having a first switch held in the normally open position by said resilient means, means for connecting said switch serially in a power circuit, a second normally closed switch carried by said pair of arms and adapted to be opened essentially simultaneously with the closing of said first switch, said second switch having means operatively connected therewith and with a control mechanism, a third normally closed switch carried by said pair of arms and adapted to be held in the open position manually by application of manual pressure on said arms, a signal circuit means operatively connected with said third switch and adapted to be energized essentially simultaneously with the opening of said first switch.

4. The combination of claim 3 wherein said handle has a hand engaging strap connected thereto and adapted to hold the handle in part within the palm of the hand of an operator.

5. The combination of claim 4 wherein said handle arms have a pair of U-shaped portions on the ends of which said first switch is carried, the opposite ends of said U-shaped portions of said arms containing said pivot means which pivotally connects said arms together.

6. The combination of claim 4 wherein said handle arms have a pair of U-shaped portions on the ends of which said first switch is carried, the opposite ends of said U-shaped portions of said arms containing said pivot means which pivotally connects said arms together, said arms having end portions adapted to project beyond the hand of the operator and containing said second and third switches.

7. In a safety device for a motor vehicle, the improvement comprising a handle containing a pair of arms, means intermediate the ends of said arms pivotally connecting said arms together, a hand-engaging strap associated with said arms and adapted to attach said arms to the hand of the motor vehicle operator, a plurality of switches carried by said arms, at least one of said switches being a normally open switch, at least one other of said switches being a normally closed switch, and resilient means opposing manual movement of said arms in one direction and maintaining said switches in the normally open and normally closed positions, respectively.

8. In a safety device for a motor vehicle, the improvement comprising a handle containing a pair of arms, means intermediate the ends of said arms pivotally connecting said arms together, a hand-engaging strap associated with said arms and adapted to attach said arms to the hand of an operator, a plurality of switches carried by said arms, at least one of said switches being a normally open switch, at least one other of said switches being a normally closed switch, and resilient means opposing manual movement of said arms in one direction and maintaining said switches in the normally open and normally closed positions, respectively, means connected with a first of said switches for attaching said first of said switches operatively in an electrical control position.

9. In a safety device for a motor vehicle, the improvement comprising a handle containing a pair of arms, means intermediate the ends of said arms pivotally connecting said arms together, a hand-engaging strap associated with said arms and adapted to attach said arms to the hand of the motor vehicle operator, a plurality of switches carried by said arms, at least one of said switches being a normally open switch, at least one other of said switches being a normally closed switch, and resilient means opposing manual movement of said arms in one direction and maintaining said switches in the normally open and normally closed positions, respectively, means connected with a first of said switches for attaching said first of said switches operatively in an electrical control position within a control circuit, means operatively connecting a second of said switches in a control position for a control mechanism.

10. In a safety device for a motor vehicle, the improvement comprising a handle containing a pair of arms, means intermediate the ends of said arms pivotally connecting said arms together, a hand-engaging strap associated with said arms and adapted to attach said arms to the hand of an operator, a plurality of switches carried by said arms, at least one of said switches being a normally open switch, at least one other of said switches being a normally closed switch, and resilient means opposing manual movement of said arms in one direction and maintaining said switches in the normally open and normally closed positions, respectively, means connected with a first of said switches for attaching said first of said switches operatively in an electrical control position for disabling an operating device, means connected with said second switch and operatively connected for energization of a control mechanism in response to the closing of said normally closed second switch.

11. The safety device of claim 10 wherein there is a third switch carried by said arms and being maintained normally closed and held opened by pressure applied to the arms to maintain an apparatus inoperative.

References Cited in the file of this patent

UNITED STATES PATENTS

| | | |
|---|---|---|
| 611,391 | Pike | Sept. 27, 1898 |
| 2,126,878 | Galli | Aug. 16, 1938 |
| 2,172,116 | Warren | Sept. 5, 1939 |
| 2,187,761 | Torrens | Jan. 23, 1940 |
| 2,287,199 | Schick | June 23, 1942 |
| 2,568,482 | Blomberg | Sept. 18, 1951 |
| 2,738,496 | Armstrong | Mar. 13, 1956 |

FOREIGN PATENTS

| | | |
|---|---|---|
| 1,099,823 | France | Mar. 23, 1955 |